United States Patent [19]

Ogata et al.

[11] Patent Number: 4,931,619
[45] Date of Patent: Jun. 5, 1990

[54] GLOW PLUG FOR DIESEL ENGINES

[75] Inventors: Yasunobu Ogata; Koichiro Kurihara, both of Kumagaya; Mitusuke Masaka, Kawagoe; Kouji Hatanaka, Saitama, all of Japan

[73] Assignees: Hitachi Metals, Ltd.; Jidosha Kiki Co., Ltd., both of Tokyo, Japan

[21] Appl. No.: 199,629

[22] Filed: May 27, 1988

[30] Foreign Application Priority Data

| May 29, 1987 | [JP] | Japan | 62-133684 |
| May 29, 1987 | [JP] | Japan | 62-133685 |
| May 29, 1987 | [JP] | Japan | 62-133686 |
| May 29, 1987 | [JP] | Japan | 62-133687 |
| May 29, 1987 | [JP] | Japan | 62-133688 |

[51] Int. Cl.⁵ .................................... F23Q 7/22
[52] U.S. Cl. ..................... 219/270; 219/552; 219/553; 123/145 A
[58] Field of Search ............... 219/270, 552, 553, 523, 219/544; 423/324; 123/145 A, 145 R; 361/264

[56] References Cited

U.S. PATENT DOCUMENTS

| 4,237,843 | 12/1980 | Page et al. | 219/270 |
| 4,475,029 | 10/1984 | Yoshida et al. | 219/270 |
| 4,486,651 | 12/1984 | Atsumi et al. | 219/270 |
| 4,499,366 | 2/1985 | Yoshida et al. | 219/270 |
| 4,742,209 | 5/1988 | Minegishi et al. | 219/270 |
| 4,806,734 | 2/1989 | Masaka et al. | 219/270 |
| 4,810,853 | 3/1989 | Maruta et al. | 219/270 |
| 4,814,581 | 3/1989 | Nunogaki et al. | 219/270 |
| 4,816,643 | 3/1989 | Zulauf et al. | 219/270 |

FOREIGN PATENT DOCUMENTS 0233424  11/1985  Japan .................. 219/270

Primary Examiner—M. H. Paschall
Attorney, Agent, or Firm—McGlew & Tuttle

[57] ABSTRACT

A glow plug for diesel engines in which a ceramic heater is supported, with the one end thereof cantilevered toward the outside, by the tip of a hollow holder; the ceramic heater is composed of a U-shaped heating portion and a pair of leads extending backwards from both ends of the U-shaped heating portion, both being formed integrally by an electrically conductive sintered sialon, which is formed by adding a small amount of $Al_2O_3$ to a raw meal containing $Si_3N_4$ as a principal ingredient, a small amount of AlN polytype and no greater than 5 wt. % of $Y_2O_3$, and mixing the addition product with 23-70 vol. % of at least one type of Ti carbide, nitride and carbide-nitride; an insulating layer is provided on the outer periphery of at least one of the leads and bonded to, and held by, the inside of the holder; and the rear end of the other of the leads is connected by means of a metallic lead wire to an external connection terminal held in an insulated state at the lead end of said holder.

20 Claims, 3 Drawing Sheets

GLOW PLUG FOR DIESEL ENGINES

BACKGROUND OF THE INVENTION

1. Field of the Invention

This invention relates generally to a glow plug to be used for preheating an auxiliary combustion chamber or combustion chamber in a diesel engine, and more particularly to a glow plug for diesel engines comprising a ceramic heater having self-saturation properties that permits after glowing for long hours.

2. Description of Prior Art

In general, a diesel engine has poor starting properties at low temperatures. To assist the diesel engine in starting, therefore, a glow plug is usually provided in an auxiliary combustion chamber or combustion chamber to raise the intake air temperature or use as an ignition source the heat generated by applying electricity to the plug. The glow plug is usually of a sheathed heater type constructed by filling a metallic sheath with heat-resistant insulating powder and embedding a heater coil, made of ferrochrome, nickel, etc., in the powder. In addition to this, a ceramic heater type is also known, as disclosed in Japanese Patent Laid-open No. 41523/1982, which comprises a heating wire, made of tungsten, etc., is embedded in an insulating ceramic material, such as silicon nitride. The ceramic heater type has been widely used in recent years because it has a better heat transfer efficiency and an excellent heat generating performance since it becomes red hot in a short period of time during heating, compared with the sheathed heater type which involves indirect heating by means of the heat-resistant insulating powder and the sheath.

The glow plug of the ceramic heater type, however, has a metallic heating wire, made of tungsten, etc., embedded in the inside of an insulating ceramic material, such as silicon nitride. Because of different coefficients of thermal expansion of both the members, a sharp temperature rise during heating and the repeated use of the heater tend to cause a deterioration the durability of the ceramic heater, posing problems in the reliability, including heat resistance, of the ceramic heater. This also results in increased manufacturing costs.

To solve this problem, a ceramic heater construction in which an electrically conductive ceramic material having a that of an insulating ceramic material is used as a heating wire has been proposed in Japanese Patent Laid-open Nos. 9085/1985 and 14784/1985. Both the proposed glow plugs however, still have problems in terms of both construction and function, and therefore have not been put into commercial application.

That is, both of them have a number of problems, such as a poor quick-heating function, the difficulty in molding a complex construction of the electrode take-off portion, and prolonged after-glow time.

To overcome the above problems, the present applicant had previously filed patent applications for his inventions of glow plugs for diesel engines in which a ceramic heater consisting of a U-shaped electrically conductive ceramic material is bonded to, and supported by, the inside of a hollow holder (Japanese Patent Application Nos. 299338/1985, 299339/1985, 256354/1986, 256355/1986, and 2643/1987). Although these inventions could solve those problems inherent in the prior art, the bonded portion of the holder and the ceramic heater must have not only a sufficient bonding strength but also good electrical insulating properties.

To this end, an insulating layer is provided between the holder and the ceramic heater. However, there still are a number of problems to be solved, such as the unavailability of suitable materials having excellent mechanical strength and electrical insulating performance needed for the insulating layer, cracking due to the thermal stress caused by the difference in the thermal expansion coefficients of component materials, and improper bonding due to insufficient wetting properties of the members being bonded.

The most common method for improving insulation performance between the holder and the ceramic heater, is to increase the thickness of an insulating layer. Formation of an insulating layer of a large thickness in a single operation, however. tends to cause voids, microcracks and other defects in the layer, leading to deteriorated insulation performance, or insulation breakdown in extreme cases. Another method for forming an insulating layer is to apply an insulating layer to the surface using a brush. This method, however, involves the difficulty in providing a uniform layer over the surface. This results in local bonding failure between the heater and the holder.

As the material for bonding the holder and the ceramic heater, glass is most commonly used. The use of conventional amorphous glass, however, leads to the softening of the amorphous glass in the subsequent process of brazing the holder and the ceramic heater with silver solder (at approx. 750° C). This could also deteriorate insulation performance and air-tightness.

As the material for the ceramic heater, electrically conductive sintered sialon is known. With the heater made of electrically conductive sintered sialon, part of the surface of the ceramic heater can be blistered when voltage is applied to the ceramic heater to cause self-heating. FIG. 1 is an enlarged cross section of part of the ceramic heater. A crack A is found developing around the blistered area in the direction parallel to the surface. Another crack B is also found in the direction normal to the surface. All this results in a loss in electrical conductivity, deteriorating the heating function of the ceramic heater.

SUMMARY OF THE INVENTION

It is the first object of this invention to provide a glow plug for diesel engines that can more quickly and positively accomplish the red heating of the tip thereof, compared with the conventional type of glow plug, thus functioning a quick-heating type glow plug.

It is the second object of this invention to provide a glow plug for diesel engines that does not cause cracking and other unwanted accidents even when rapidly heated at the self-heating of the ceramic heater, thus maintaining heat resistance and reliability.

It is the third object of this invention to enable an engine equipped with this glow plug to maintain after-glowing for long hours as a means for coping with exhaust gas and noise problems.

It is the fourth object of this invention to provide a glow plug for diesel engines that is simple in construction and easy to manufacture.

It is the fifth object of this invention to provide a glow plug for diesel engines in which the material used for an insulating layer does not degrade even at the bonding temperature, maintaining the electrical insula-

DETAILED DESCRIPTION OF PREFERRED EMBODIMENTS

Figure 1:
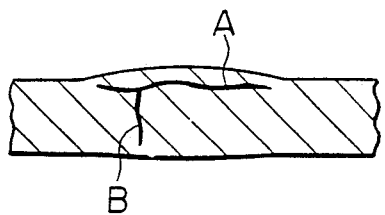
FIG. 1 is an enlarged cross section illustrating a blistered part of a ceramic heater of a conventional type.
Figure 2:
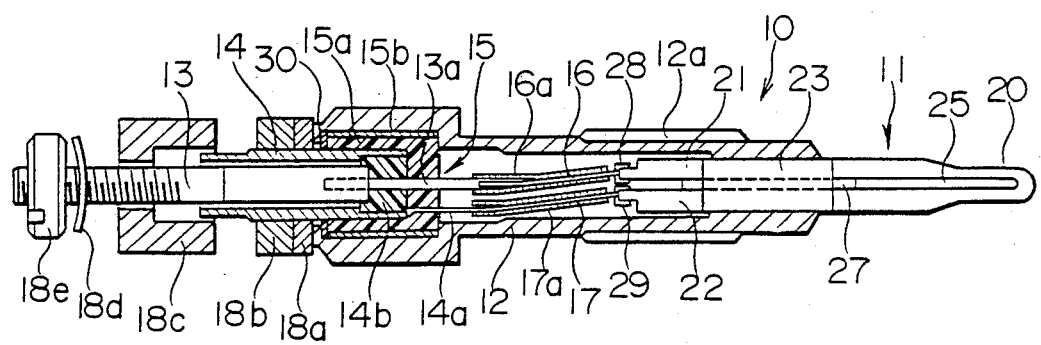
FIG. 2 is a longitudinal section illustrating an embodiment of this invention.

FIG. 2 is a longitudinal section showing an embodiment of this invention. The construction of a glow plug which is referred to as numeral 10 in the figure will be outlined in the following. The glow plug 10 has a rod-shaped ceramic heater 11, the tip of which serves as a heating element, and a substantially tubular metallic holder 12, made of stainless steel, for example, which holds the ceramic heater 11 at the tip thereof. A threaded part 12a is formed on the outer periphery of the holder 12, and screwed into a threaded hole (not shown) provided on the cylinder head of the engine to support the tip of the ceramic heater 11 in a cantilevered state into a combustion chamber or auxiliary combustion chamber. At the rear end of the holder 12, fitted and supported is a terminal assembly 15 consisting of first and second external connection terminals 13 and 14, which are passed and embedded into an assembly body 15a, made of a synthetic resin or an appropriate other insulating material. The terminals 13 and 14 are connected to leads 21 and 22 comprising the ceramic heater 11 via metallic lead wires 16 and 17, such as flexible wires, and terminal caps 28 and 29.

Next, the terminal assembly 15 has a first external connection terminal 13 having at the inner end thereof a rod portion 13a disposed on the axis of the terminal assembly 15 via an insulating member 14b and connected to the metallic lead wire 16, and a second tubular external connection terminal 14 having a lead piece 14a disposed at a predetermined gap around thereof and connected to the metallic lead wire 17, and an assembly body 15a integrally formed with a resin in such a manner as to insulate both the terminals 13 and 14 and the outer periphery of the terminal 14. A metallic tube 15b for reinforcing the connecting portion is fitted on the outer periphery of the assembly body 15a. The metallic tube 15b is crimped by exerting a high pressure to the edge of the open rear end of the holder 12 until the metallic tube 15b is buckled along the axial line so that the inside of the metallic tube 15b is forced onto the side of the assembly body 15a made of a resin and the outside thereof onto the inside surface of the holder 12, thereby eliminating the effects of external force or thermal shrinkage.

Furthermore, 18a and 18b refer to an insulating ring and a washer, respectively, both being fitted to the second external connection terminal 14 protruding toward the rear of the holder 12. 18c refers to an insulating member to be fitted to the side of the first external connection terminal 13 immediately adjacent to the outside end of the washer 18b. 18d and 18e refer to a spring washer and a fixing nut, respectively, to be fitted and screwed to the threaded part formed on the outside end of the first external connection terminal 13. The first and second external connection terminals 13 and 14 are electrically connected to the battery by interposing lead wires (not shown) drawing from the battery between the washer 18b and the insulating member 18c and between the insulating member 18c and the spring washer 18d. 16a and 17a refer to insulating members, such as tubes, for covering the metallic lead wires 16 and 17.

The ceramic heater 11 can be formed by mixing electrically conductive sialon powder, for example, with thermoplasitc resin, etc., injection molding the mixture into a metal mold having a predetermined cavity and baking the molding, or by machining a rod-shaped blank into a predetermined shape by electrical discharge machining or cutting. A heating portion 20 of the heater 11 is formed in a smaller diameter than that of the leads 21 and 22 so that the thickness of the heating portion 20 becomes smaller than the thickness of the leads 21 and 22. A slit 25 is formed at the middle part of the ceramic heater 11 from the heating portion 20 towards the leads 21 and 22. An insulating layer 23 is formed on the outer peripheral surface of the leads 21 and 22.

Numeral 30 refers to a sealing sheet, made of rubber, asbestos, etc., which is placed on the outside end of the terminal assembly 15 having first and second external connection terminals 13 and 14 at the open rear end of the holder 12 to mechanically seal the portion. An insulating sheet 27, made of mullite or other insulating ceramic material may be integrally bonded at least at a location corresponding to the tip of the holder 12 between the lead wires 21 and 22 which form the slit 25. With this arrangement, the slit 25 can be sealed at the tip of the holder 12 to prevent engine combustion pressure from escaping to the outside. Furthermore, this arrangement helps improve the mechanical strength of the rear end of the ceramic heater 11 at which the heater 11 is supported by the holder 12.

Next the material used in manufacturing the ceramic heater of this invention will be described.

The ceramic heater is an electrically conductive sialon produced by adding a small amount of $Al_2O_3$ to raw material powder, which consists of $Si_3N_4$ as the principal ingredient, a small amount of AlN polytype an less than 5 wt. % of $Y_2O_3$, and mixing the addition product thus formed with 23–70 vol. % of at least one type of the carbide, nitride and carbide/nitride of Ti, and sintering the mixture.

In this invention a carbide, nitride or carbide-nitride of Ti is added as an electrically conductive compound for the following reasons.

Although the use of any of carbides, nitrides or borides of the IVa, Va, or VIa column can of course produce an electrically conductive sintered sialon, carbides and nitrides of Ti are most suitable when considering sintering properties in the cold or gas-pressure sintering in which a sintered product of a relatively complex shape can be obtained.

The above-mentioned carbide, nitride or carbidenitride of Ti is added in an amount 23–70 vol. % for the following reasons. An amount of addition less than 23 vol. % would not produce appropriate electrically conductive paths by the contact of the grains of the carbide, nitride or carbide-nitride, leading to poor conductivity.

With an amount of addition of more than 70 vol. %, the anti-oxidation properties and high-temperature strength characteristic of β-type sialon are remarkably deteriorated.

Among $Al_2O_3$, AlN, $Y_2O_3$, etc. commonly used as the sintering assistant, $Y_2O_3$ greatly affects the anti-oxidation properties of a sintered product consisting of an electrically conductive sialon. The durability of an electrically conductive sialon at elevated temperatures is remarkably of $Y_2O_3$ is not greater than 5 wt. % in this invention because a $Y_2O_3$ content more than 5 wt. % tends to cause the aforementioned blistering phenomenon. A $Y_2O_3$ content of 4 wt. % yields better effects, while a $Y_2O_3$ content no of less than 1% drastically reduce the sintering assistant effects. Thus, the most desirable range of $Y_2O_3$ content is 1-4 wt. %.

Next, the material for forming the insulating layer 23 will be described. Since sufficient adhesion strength and air-tightness must be maintained between the ceramic heater 11 and the holder 12 shown in FIG. 2 to prevent engine combustion pressure from escaping to the outside, a fusible bonding material, such as silver solder, is usually used. For this reason, the material for forming the insulating layer 23 must be of a type that does not degrade even during silver solder brazing (700°-850° C.), such as amorphous glass having a softening temperature of over 700° C. The amorphous glass is ground and mixed with a binder of an ethyl cellulose type, for example, and a flux to form a paste, and the resulting paste is applied to the outer periphery of the formed ceramic heater 11 and baked to produce the insulating layer of a film thickness of 10-100 μm. The outer periphery of the insulating layer 23 thus formed on the ceramic heater 11 is fixedly bonded to the holder 12 shown in FIG. 2 by means of silver solder, for example.

The insulating layer 23 is provided to ensure electrical insulation between the ceramic heater 11 and the holder 12. With an insulating layer of less than 10 μm thick, however, a predetermined insulation resistance cannot be maintained. With an insulating layer thickness exceeding 100 μm, not only the degree of improvement of dielectric strength becomes saturated but also cracks tend to be caused in the insulating layer 23 due to a minute difference in the thermal expansion coefficients of the ceramic heater 11 forming the base material and the insulating layer 23. Furthermore, an increase in manhours could result due to the increase in the number of multiple-layer coating.

When a test is conducted on a glow plug 10 assembled using a ceramic heater 11 having an overall size of 5 mmφ×50 mm, with the heating portion 20 formed into a size of 3 mmφ×10 mm, it was confirmed that the temperature of the heater reaches 800° C. in 3.5 sec. and rises to approximately 1,100° C. with the saturation temperature being kept below the allowable limit of 1,200° C. The air-tightness between the ceramic heater 11 and the holder 12 was found perfect and it was also confirmed in a heat endurance test and an intermittent endurance test that the electrical insulation between both was perfect.

Next, an example where crystalline glass was used as the material for forming the insulating layer 23 will be described.

First, a paste was prepared by grinding and mixing the following materials, and adding to the mixture a binder (Du Pont No. 9429) and a flux.

| | |
|---|---|
| Principal ingredients: $SiO_2$, $Al_2O_3$ | 40 wt. % |
| Nucleating oxide: $TiO_2$ | 10 wt. % |
| Other glass oxides: BaO, ZnO, CaO, etc. | 50 wt. % |

The resulting paste was applied to the outer periphery of a preformed ceramic heater and baked to form an insulating layer 23 of 10-100 μm thickness. The outer periphery of the insulating layer 23 thus formed on the ceramic heater 11 was fixedly bonded to the holder 12 shown in FIG. 2 using silver solder, for example. The ceramic heater formed using amorphous glass as the material for the insulating layer 23 in the aforementioned manner also showed excellent results, as in the case of the embodiment described earlier.

Next, a glow plug 10 was assembled by preparing a paste from a mixed glass of amorphous glass and crystalline glass as the material for forming the insulating layer 23, in the same manner as in the case of the above-mentioned amorphous glass having a high softening temperature. The volume ratio of a mixture of amorphous and crystalline glass should preferably be more than 5% and less than 70% of amorphous glass. The glow plug thus assembled showed the same performance as the above-mentioned embodiment.

Figure 3:
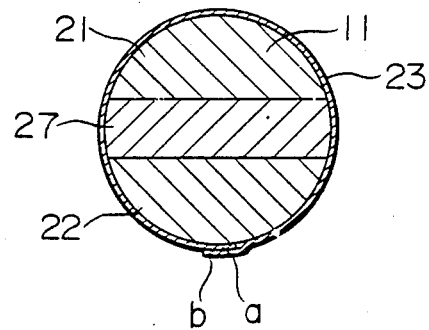
FIG. 3 is an enlarged cross section of a ceramic heater in another embodiment of this invention.

Next, FIG. 3 is an enlarged cross section of a ceramic heater in another embodiment of this invention. Like numerals correspond with like parts shown in FIG. 2. In FIG. 3, the insulating layer 23 is formed by applying the paste prepared in the same manner as described above to the outer periphery of the preformed ceramic heater 11 with screen printing using a 300-mesh metal netting, made of stainless steel, for example. In this case, an insulating layer 23 of a uniform thickness, with the leading edge a and trailing edge b thereof being overlapped, can be formed by applying the paste with a brush while rotating the ceramic heater 11 under the metal netting. The thickness of a single-layer insulating layer 23 formed in the abovementioned manner is in the neighborhood of 15 μm. A thicker insulating layer 23 of a predetermined size can be formed by laminating a plurality of such single-layer insulating layers. In this case, lamination of a plurality of single layers can cover a void or microcrack on any one single layer with another sound single layer, thus preventing the exposure of the ceramic heater surface through such a void or microcrack and leading to improved insulation performance. The greater the number of laminations the better become insulation performance, but the appropriate number of laminations taking into account productivity would be two to five layers, or preferably two to three layers. Although the leading and trailing ends a and b (see FIG. 3.) of each layer in the above-mentioned lamination overlap each other, variations in the layer thickness can be minimized by slightly shifting the overlapped portion of each adjoining layer. The outer periphery of the insulating layer 23 formed in this way on the ceramic heater 11 is bonded to the inside of the holder 12 shown in FIG. 2 using silver solder. When changing the thickness of the paste film in the above mentioned screen printing, the viscosity of the paste or the mesh of the metal netting may be changed accordingly.

Next, the bonding method of the ceramic heater 11 and the holder 12 will be described. The most commonly used material for bonding both is silver solder. The use of the insulating layer 23 made of an insulating material, such as glass, on the outer periphery of the leads 21 and 22 of the ceramic heater 11, however, can cause imperfect bonding due to the insufficient wettability of the insulating layer 23 with silver solder, leading to deteriorated air tightness. To improve the wetting properties of the insulating layer 23, therefore, a metallized layer can be formed on the outer periphery of the insulating layer 23. Various types of metallized layers of a 5–20 μm thickness were formed by using five types of material for forming the metallized layer; Ag-Pd paste, Ni paste, Ni plating, Ag paste, and Ni plating/Ag paste, and baking at 750°–850° C. Then, glow plugs 10 as shown in FIG. 2 and having each of the metallized layers were assembled. The holders 12 made of stainless steel, for example, are bonded to the ceramic heaters 11 using silver solder.

Table 1 shows the results of air-tightness tests on the above-mentioned glow plugs 10, in which ten samples were tested by immersing them in the water to which ten atmospheric pressure was applied.

TABLE 1

| Metallized layer | Acceptance rate (%) |
| --- | --- |
| Ag—Pd paste | 100 |
| Ni paste | 100 |
| Ni plating | 30 |
| Ag paste | 20 |
| Ni paste + Ag paste | 60 |
| (Without metallized layer) | 0 |

As is evident from the table above, the glow plugs without the metallized layer could not ensure satisfactory air-tightness because the ceramic heater 11 was not properly bonded to the holder 12 due to insufficient wetting performance between the insulating layer 23 provided on the leads 21 and 22 of the ceramic heater 11 and silver solder as the bonding material. With the glow plugs 10 having the metallized layer of this invention, on the other hand, the wetting properties with silver solder could be maintained, ensuring good bonding. Particularly, the metallized layers made of Ag-Pd paste and Ni paste were found exhibiting perfect air-tightness.

Next, the means for preventing the blistering phenomenon occurring on the outside surface of the ceramic heater will be described. As noted earlier, blistering must be prevented because that phenomenon reduces electric conductivity. The present inventor et al. studied the causes of the blistering phenomenon in electrically conductive sintered sialon, and reached the conclusion that blistering is related to the thickness of the oxide layer formed in the sintered product. First, an electrically conductive sintered sialon was obtained by adding a small amount of $Al_2O_3$ to the raw meal containing $Si_3N_4$ as the principal ingredient and 7 wt. % of $Y_2O_3$, mixing the addition product with 30 vol. % of at least one type of the carbide, nitride and carbide/nitride of Ti, and sintering the mixture. The sintered product was formed into dimensions (of a semi-circular cross section, length: approx. 20 mm) corresponding to the heating portion 20 of the ceramic heater 11 shown in FIG. 2. When a voltage of 5V was applied across both ends of the sintered product the sintered product showed such a temperature distribution that the highest temperature was reached at the central part of the sintered product, with temperature gradually decreasing toward the ends of the sintered product. Approximately 30 seconds after the voltage was applied, the temperature distribution was stabilized with the central part reaching approx. 1,020° C. and the ends approx. 700° C.

Judging from the fact that blistering frequently occurs at a particular location several milimeters away from the center of the sintered product, and from the above-mentioned temperature distribution, it is estimated that there is a close relationship between blistering and temperature.

To ascertain this, an electrically conductive sintered was put into an electric furnace, and held at various temperatures to study the relationship between heating temperatures and changes in the structure of the sialon. As a result, it was found that the thickness of the oxide layer becomes very larger in the vicinity of 850° C. of heating temperature than at any other temperatures. It was found from the relationship between the above-mentioned temperature distribution and the location of blistering that blistering tends to occur at locations where the oxide layer is thick. This means that control of the thickness of the oxide layer is of importance to prevent blistering.

Next, the effects of the addition of $Y_2O_3$ as a sintering assistant will be described.

First, Test specimens 1 through 5 and a control were prepared by blending $Si_3N_4$, AlN polytype, and $Y_2O_3$ at the blending ration shown in Table 2, adding 5 wt. % of $Al_2O_3$ to the mixture, mixing 30 vol. % of TiN with the addition product to obtain the raw meals. Each of the raw meals was formed with cold isostatic pressing, and sintered at 1,600°–1,900° C. in a nitrogen atmosphere at normal pressures. The raw meals may be formed with pressing, injection molding, slip casting and other operations, instead of cold isostatic pressing. The properties of sintered products can he further improved by hot isostatic pressing them after sintering.

TABLE 2

| | (Unit: wt. %) | | |
| --- | --- | --- | --- |
| | $Si_3N_4$ | AlN polytype | $Y_2O_3$ |
| Test specimen 1 | 95.3 | 3.2 | 1.5 |
| Test specimen 2 | 94.8 | 3.2 | 2 |
| Test specimen 3 | 93.9 | 3.1 | 3 |
| Test specimen 4 | 92.9 | 3.1 | 4 |
| Test specimen 5 | 91.9 | 3.1 | 5 |
| Control | 90 | 3 | 7 |

These sintered products are formed into the same shape and dimensions as described above, and held at 850° C. for 80 hours in a heating furnace, and then the thicknesses of the oxide layers produced on the surface of the test specimens and the control were measured.

Figure 4:
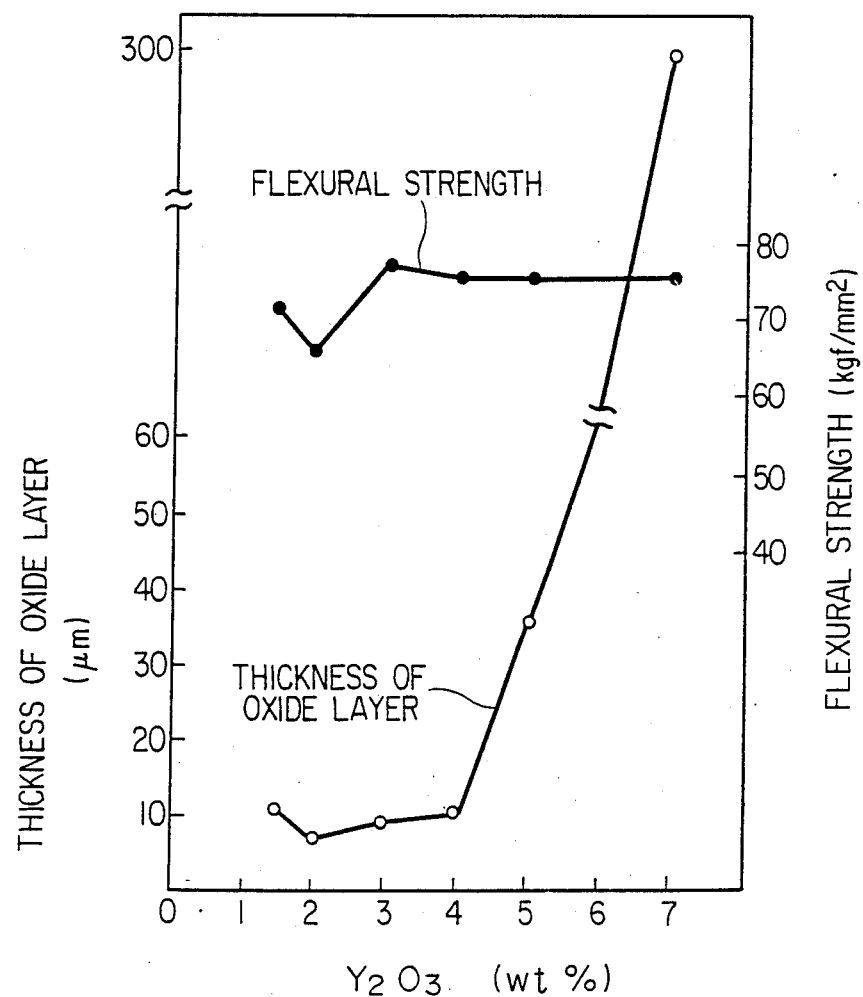
FIG. 4 is a diagram illustrating the relationship between the content of $Y_2O_3$, and the thickness of the oxide layer and flexural strength.

FIG. 4 is a diagram illustrating the relationship between the content of $Y_2O_3$, and the thickness and flexural strength of the oxide layer. As is evident from the figure, when the $Y_2O_3$ content exceeds 5 wt. %, the oxide layer becomes thick quickly. This means that with a $Y_2O_3$ content of 5 wt. % or the sintered product has a high antioxidation properties, hardly causing blistering. With a $Y_2O_3$ content of 4 wt. % of less, more desirable results can be obtained since the oxide layer produced invariably has a thickness of approx. 10 μm, exhibiting sufficient antioxidation properties. In addition, it was found that changes in the content of $Y_2O_3$ have very little effects on flexural strength.

Figure 5:
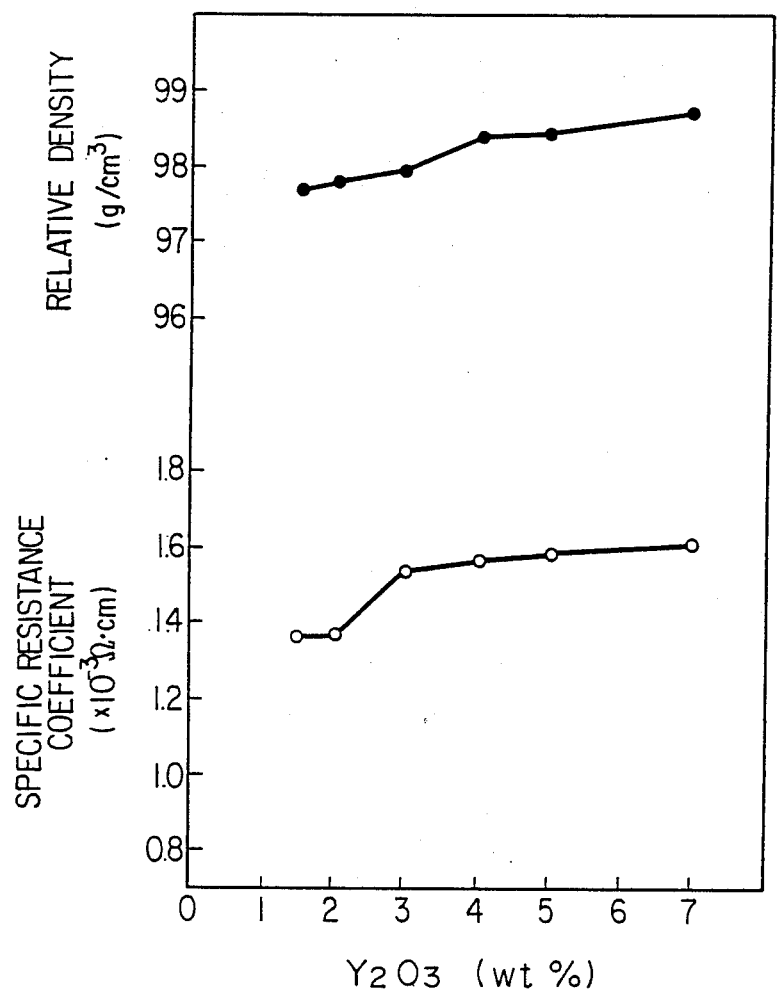
FIG. 5 is a diagram illustrating the relationship between the content of $Y_2O_3$, specific resistance coefficient and relative density.

Next, FIG. 5 shows the relationship between the content of $Y_2O_3$, and resitivity and relative density. As is apparent from FIG. 5, even when the content of $Y_2O_3$ extremely small.

It follows from this that even when the $Y_2O_3$ is reduced to less than 5 wt. % to improve the anti-oxidation properties of electrically conductive sintered sialon to prevent blistering, practically no effects are exerted on the specific resistance coefficient and other properties of electrically conductive sintered sialon.

Next, test specimens 6 and 7 and a control were prepared by blending $Si_3N_4$, AlN polytype, and $Y_2O_3$ at the blend ratio shown in Table 3, adding 5 wt. % of $Al_2O_3$ to the mixture, mixing 30 vol. % of TiN with the addition product to obtain raw meals. Each of the resulting raw meal was formed and sintered under the same conditions as described above with test specimens 1 through 5.

TABLE 3

| | (Unit: wt. %) | | |
|---|---|---|---|
| | $Si_3N_4$ | AlN polytype | $Y_2O_3$ |
| Test specimen 6 | 93.9 | 3.1 | 3 |
| Test specimen 7 | 91.9 | 3.1 | 5 |
| Control | 90 | 3 | 7 |

Electrodes are provided on both ends of each sintered product (the shape and dimensions of which are the same as those of test specimens 1 through 5), and voltage is continuously applied to the electrodes to hold the central part of the sintered product at 1,100° C. In this state, the time elapsed until each sintered product was oxidized to cause a blister, developing a crack was measured. The measurement results were shown in Table 4.

In addition, test specimens 6 and 7 and the control prepared at the composition shown in Table 3 were repeatedly subjected to a cycle of applying voltage to them until 1,100° C. was reached at the central part of them, holding them for 30 seconds at that temperature, and the cutting off the voltage for 60 seconds, to determine the time and the number of such cycles the test specimens and the control can withstand. The measurement results are also included in Table 4.

TABLE 4

| | Amount of $Y_2O_3$ | Endurance time | Endurance cycle |
|---|---|---|---|
| Test specimen 6 | 3 wt. % | ≧1,000 hr | ≧120,000 cycles |
| Test specimen 7 | 5 wt. % | 500–700 hr | ≧70,000 cycles |
| Control | 7 wt. % | Approx. 100 hr | Approx. 15,000 cycles |

As is evident from Table 4, with a $Y_2O_3$ content of 5 wt. % or less, the test specimens had a considerable longer endurance time than the control; at 3 wt. %, the test specimens had a durability enough to withstand blistering. The sintered product with a $Y_2O_3$ content of 5 wt. % has considerably better durability than the control. At 3 wt. % of $Y_2O_3$ content, the test specimen sufficient durability.

Next, two test specimen were prepared in the same manner as with the test specimens described above; with TiN in the composition of the test specimen 6 above replaced with TiC and TiCN.

On the two sintered products thus prepared, endurance time until blistering occurs was measured, and endurance cycles were also measured by repeating the on-off of voltage. The measurement results were almost the same as with the test specimen 6.

In the above-mentioned embodiments, two external connection terminals are electrically connected to metallic lead wires provided on the leads of the ceramic heater. Either of external connection terminals may be electrically connected to the rear part of the holder.

This invention is not limited to the constructions of the embodiments described above, and the shape, construction, etc. of each part may be changed or modified appropriately. The ceramic heater 11, for example, is not limited to a circular cross-sectional shape, by may be of a rectangular, square, polygonal, or oblong cross-sectional shape. Furthermore. as the method of forming the insulating layer, brushing, spraying or any other appropriate known means for producing a paste or slurry film may be employed. In addition, the means for forming the insulating layer by laminating single layers is not limited to screen printing as used in the above-mentioned embodiments, but any other appropriate film-laminating or coating means may be employed. The bonding material for bonding the ceramic heater to the holder may be any appropriate materials, other than silver solder, that can match with the material of the insulating layer and that of the holder.

Having the above-mentioned construction, the glow plug for diesel engines of this invention has the following beneficial effects.

(1) Despite its simple construction, the glow plug having a heating portion exposed on the outside surface of the heater can red heat the tip thereof more rapidly and positively than the conventional type, and can give full play to the quick-heating function thereof.

(2) Since the electrically conductive ceramics for forming the heating portion and the leads are made of the same material, virtually no cracking and other accidents are caused by sharp temperature rise during the heating of the heater, thus ensuring reliability, such as heat resistance.

(3) Because of a small thermal capacity of the tip of the heating portion, the heater has self temperature saturation properties, enabling after glowing for a long time as exhaust gas and noise control measures for the diesel engine.

(4) Having a simple overall construction, the forming, machining and assembly of the glow plug is easy, leading to improved productivity.

(5) Since the material forming the insulating layer does not degrade even at bonding temperatures of the bonding material, maintaining electrical insulation performance, and eliminating thermal stress cracking, air-tightness and electrical insulation performance can be substantially improved, and reliability can be drastically improved.

(6) Because of an extremely small dimensional difference in the thickness of the insulating layer, the ceramic heater can be very easily and positively bonded to the holder.

(7) Since appropriate wetting properties can be maintained between the ceramic heater and the bonding material, air-tightness can be perfectly accomplished, leading to drastically improved reliability.

(8) Blistering of the ceramic heater can be prevented by keeping the $Y_2O_3$ content in the chemical composition of the ceramic heater to no greater than 5 wt %, resulting in less liability to cracking and increased durability. Even with a $Y_2O_3$ content of 5 wt. % or less, the flexural strength, specific resistance coefficient and other properties of the ceramic heater remain almost the same as that having higher $Y_2O_3$ contents. And, no problems need arise even when the $Y_2O_3$ content is reduced.

What is claimed is:

1. A glow plug for diesel engines comprising a ceramic heater supported, with one end thereof cantilevered toward the outside, by the tip of a hollow holder; said ceramic heater is composed of a U-shaped heating portion and a pair of leads extending backwards from both ends of said U-shaped heating portion, both being formed integrally by an electrically conductive sintered sialon, which is formed by adding a small amount of $Al_2O_3$ to a raw meal containing $Si_3N_4$ as a principal ingredient, a small amount of AlN polytype and 5 wt. % or less of $Y_2O_3$, and mixing the addition product with 23–70 vol. % of at least one type of Ti carbide, nitride and carbide-nitride; an electrically insulating layer is provided on the outer periphery of at least one of said leads and bonded to, and held by, the inside of said holder; and the rear end of at least one of said leads is connected by means of a metallic lead wire to an external connection terminal held in an insulated state at the lead end of said holder.

2. A glow plug for diesel engines as claimed in claim 1 wherein said insulating layer is made of amorphous glass having a softening point of over 700° C. or crystalline glass and formed into a film thickness of 10–100 μm.

3. A glow plug for diesel engines as claimed in claim 1 wherein said electrically insulating layer is made of a mixed glass of amorphous glass and crystalline glass and formed into a film thickness of 10–100 μm.

4. A glow plug for diesel engines as claimed in claim 1 wherein said insulating layer is formed by a plurality of laminated layers.

5. A glow plug for diesel engines as claimed in claim 1 wherein said insulating layer is formed, keeping dimensional difference in the thickness of said insulating film to 100 μm or less.

6. A glow plug for diesel engines as claimed in claim 1 wherein the wall thickness of said U-shaped heating portion comprising said ceramic heater is made smaller than the wall thickness of said leads.

7. A glow plug for diesel engines as claimed in claim 1 wherein an insulating layer is provided on the outer periphery of said leads and bonded to, and held by said holder; the rear ends of said leads are connected to said external connection terminals supported in an insulated state at the rear end of said holder via metallic lead wires.

8. A glow plug for diesel engines as claimed in claim 1 wherein an insulating layer is provided on the outer periphery of said leads and bonded to, and held by, said holder; one of the rear ends of said leads is connected to the rear end of said holder, and the other thereof to an external connection terminal held in an insulated state at the rear end of said holder.

9. A glow plug for diesel engines as claimed in claim 1 wherein said insulating layer is formed with screen printing.

10. A glow plug as claimed in claim 1 wherein the amount of $Y_2O_3$ is 1–4 wt. %.

11. A glow plug for diesel engines comprising a ceramic heater supported, with one end thereof cantilevered toward the outside, by the tip of a hollow holder; said ceramic heater is composed of a U-shaped heating portion and a pair of leads extending backwards from both ends of said U-shaped heating portion, both being formed integrally by an electrically conductive sintered sialon, which is formed by adding a small amount of $Al_2O_3$ to a raw meal containing $Si_3N_4$ as a principal ingredient, a small amount of AlN polytype and 5 wt. % or less of $Y_2O_3$, and mixing the addition product with 23–70 vol. % of at least one type of Ti carbide, nitride and carbide-nitride; an electrically insulating layer and a metallized layer are provided on the outer periphery of at least one of said leads and bonded to, and held by, the inside of said holder via a bonding material; and the rear end of at least one of said leads is connected by means of a metallic lead wire to an external connection terminal held in an insulated state at the lead end of said holder.

12. A glow plug for diesel engines as claimed in claim 11 wherein said insulating layer is made of amorphous glass having a softening point of more than 700° C. or crystalline glass and formed into a film thickness of 10–100 μm.

13. A glow plug for diesel engines as claimed in claim 11 wherein said insulating layer is formed with screen printing.

14. A glow plug for diesel engines as claimed in claim 11 wherein said metallized layer is formed by baking one of Ag-Pd paste and Ni paste.

15. A glow plug as claimed in claim 11 wherein the amount of $Y_2O_3$ is 1–4 wt.%.

16. A glow plug for diesel engines comprising a ceramic heater supported, with one end thereof cantilevered toward the outside, by the tip of a hollow holder; said ceramic heater is composed of a U-shaped heating portion and a pair of leads extending backwards from both ends of said U-shaped heating portion, both being formed integrally by an electrically conductive sintered sialon, which is formed by adding a small amount of $Al_2O_3$ to a raw meal containing $Si_3N_4$ as a principal ingredient, a small amount of AlN polytype and 5 wt. % or less of $Y_2O_3$, and mixing the addition product with 23–70 vol. % of at least one type of Ti carbide, nitride and carbide-nitride; an insulating sheet is integrally interposed between said leads of said ceramic heater at least at a location corresponding to the tip of said holder. and an electrically insulating layer is provided on the outer periphery of at least one of said leads and bonded to, and held by, the inside of said holder; and the rear end of at least one of said leads is connected by means of a metallic lead wire to an external connection terminal held in an insulated state at the lead end of said holder.

17. A glow plug for diesel engines as claimed in claim 16 wherein said insulating layer is made of amorphous glass having a softening point of more than 700° C. or crystalline glass and formed into a film thickness of 10–100 μm.

18. A glow plug for diesel engines as claimed in claim 16 wherein said insulating layer is formed with screen printing.

19. A glow plug as claimed in claim 16 wherein the amount of $Y_2O_3$ is 1–4 wt. %.

20. A glow plug for diesel engines characterized in that a ceramic heater supported, with one end thereof cantilevered toward the outside, by the tip of a hollow holder; said ceramic heater is composed of a U-shaped heating portion and a pair of leads extending backwards from both ends of said U-shaped heating portion, both being formed integrally by an electrically conductive sintered sialon; an electrically insulating layer is provided on the outer periphery of at least one of said leads and bonded to, and held by, the inside of said holder; said insulating layer being made of amorphous glass having a softening point of more than 700° C. or crystalline glass and formed into a film thickness of 10–100 μm; and the rear end of at least one of said leads is connected by means of a metallic lead wire to an external connection terminal held in an insulated state at the rear end of said holder.

* * * * *